United States Patent
Sunohara et al.

(10) Patent No.: US 7,395,658 B2
(45) Date of Patent: Jul. 8, 2008

(54) APPARATUS AND METHOD FOR ESTIMATING NOX TRAP CATALYST ADSORPTION AMOUNT

(75) Inventors: Daisuke Sunohara, Minato-ku (JP); Susumu Kouketsu, Minato-ku (JP); Shinji Nakayama, Minato-ku (JP); Keiki Tanabe, Minato-ku (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 326 days.

(21) Appl. No.: 11/234,432

(22) Filed: Sep. 23, 2005

(65) Prior Publication Data

US 2006/0064968 A1    Mar. 30, 2006

(30) Foreign Application Priority Data

Sep. 24, 2004    (JP) .............................. 2004-277820

(51) Int. Cl.
  *F01N 3/00* (2006.01)
(52) U.S. Cl. ...................................... 60/277
(58) Field of Classification Search ................ 60/274, 60/277, 285, 286, 295
  See application file for complete search history.

(56) References Cited

U.S. PATENT DOCUMENTS

| | | | |
|---|---|---|---|
| 5,595,060 A * | 1/1997 | Togai et al. | 60/274 |
| 6,101,809 A * | 8/2000 | Ishizuka et al. | 60/276 |
| 6,205,773 B1 * | 3/2001 | Suzuki | 60/276 |
| 6,311,484 B1 * | 11/2001 | Roth et al. | 60/301 |
| 6,705,077 B2 * | 3/2004 | Uedahira et al. | 60/278 |
| 6,826,902 B2 * | 12/2004 | Sun et al. | 60/274 |
| 2004/0244361 A1 * | 12/2004 | Tanabe et al. | 60/274 |
| 2006/0112681 A1 * | 6/2006 | Nakayama et al. | 60/286 |

FOREIGN PATENT DOCUMENTS

| | | |
|---|---|---|
| EP | 0 735 250 A2 | 10/1996 |
| EP | 1 083 306 A1 | 3/2001 |
| EP | 1 273 337 A1 | 1/2003 |
| JP | 09-072235 A | 3/1997 |

OTHER PUBLICATIONS

Relevant portion of European Search Report of corresponding European Application EP 05 02 0300.

* cited by examiner

*Primary Examiner*—Thomas Denion
*Assistant Examiner*—Loren Edwards
(74) *Attorney, Agent, or Firm*—Rossi, Kimms & McDowell, LLP

(57) ABSTRACT

There is provided an apparatus that estimates the NOx adsorption amount, comprising a NOx trap catalyst that is disposed in an exhaust passage of an engine, for adsorbing NOx in exhaust gases during lean operation and releasing and reducing the adsorbed NOx during rich operation, an operation unit that computes an amount of emission from the catalyst during rich operation by using a map or a polynomial equation that reflects emissions from the catalyst based on the exhaust gas temperature and the exhaust gas flow rate of the exhaust passage and the excess-air factor upstream of the catalyst, and an estimating unit that estimates an amount of adsorption in the NOx trap catalyst from the computed emission amount.

4 Claims, 4 Drawing Sheets

APPARATUS AND METHOD FOR ESTIMATING NOX TRAP CATALYST ADSORPTION AMOUNT

BACKGROUND OF THE INVENTION

1. Field of the Invention

The present invention relates to an apparatus and method for estimating the amount of NOx adsorption in a NOx trap catalyst provided in an exhaust passage.

2. Description of the Related Art

Conventionally, a NOx trap catalyst adsorbs NOx (nitrogen oxides) in exhaust gases when the exhaust air-fuel ratio is lean, and releases and reduces the adsorbed NOx when the exhaust air-fuel ratio is rich. Specifically, the catalyst adsorbs NOx in exhaust gases as nitrate salt in an oxygen excess condition (oxidized atmosphere) and reduces the adsorbed NOx into nitrogen in a carbon monoxide excess condition (reduced atmosphere).

In an engine equipped with the above catalyst, rich spike is performed such that the mode of operation is intermittently switched to rich operation before the NOx adsorption amount reaches a level of saturation, thereby suppressing the deterioration of catalytic performance caused by an increase in NOx adsorption amount. As a result, the catalyst is regenerated, and exhaust gases are satisfactorily purified.

The rich spike can be implemented in two ways: in-cylinder rich operation and out-of-cylinder rich operation. Specifically, the in-cylinder rich operation can be implemented by, for example, a method in which exhaust-gas recirculation (EGR) is performed at a high recirculation rate such that carbon monoxide (CO) emitted from cylinders by imperfect combustion is used as a reductant, or a method in which unburned fuel (HC) as a reductant is supplied into cylinders by post (after) injection in exhaust strokes. On the other hand, the out-of-cylinder rich operation can be implemented by, for example, a method in which the HC is added to an exhaust passage, that is, fuel is directly supplied to the catalyst.

Here, to perform the rich spike, it is necessary to accurately estimate or detect the NOx adsorption amount. For this purpose, there has been proposed a technique in which the NOx adsorption amount is estimated using a mathematical catalytic model based on chemical/physical reactions of a catalyst (Japanese Laid-Open Patent Publication (Kokai) No. H09-72235).

According to this technique, at least one oxygen sensor is provided downstream of the catalyst so that the amount of NOx adsorption in the catalyst can be estimated. However, the principal objective of this technique is to control the air-fuel ratio for a three-way catalyst. That is, it is difficult to apply this technique to the NOx trap catalyst because the three-way catalyst differs from the NOx trap catalyst in model structure. Also, in the case where the NOx adsorption amount is estimated using other catalytic model, it is necessary to sequentially change model equations because the characteristic value varies depending on types of catalyst. Besides, to cope with the deterioration of the catalyst, more detailed modeling is required. Thus, according to the above conventional technique, even though it is possible to estimate the NOx adsorption amount, problems to be addressed still remain where accurate estimation of the NOx adsorption amount is concerned.

Also, to estimate the amount of NOx adsorption in the NOx trap catalyst, it is necessary to keep in mind that the NOx emission during the rich spike, i.e. a decrease in NOx adsorption amount has to found. This is because the latest NOx adsorption amount cannot be accurately identified unless a decrease in NOx adsorption amount caused by the rich spike is taken into consideration. To estimate the NOx adsorption amount, a method can be envisaged in which values related to a reductant emitted from cylinders are estimated in advance, the NOx emission is calculated using the values, and the NOx adsorption amount is then estimated. However, this method raises concern that the scope of application of the rich spike is narrowed.

SUMMARY OF THE INVENTION

It is an object of the present invention to provide an apparatus and method for estimating the amount of NOx adsorption in a NOx trap catalyst, which can widen the scope of application of rich spike and estimate the NOx adsorption amount with high accuracy.

To attain the above object, there is provided an apparatus for estimating the amount of NOx adsorption, comprising a NOx trap catalyst that is disposed in an exhaust passage of an engine, for adsorbing NOx in exhaust gases during lean operation and releasing and reducing the adsorbed NOx during rich operation, an operation unit that computes an amount of emission from the NOx trap catalyst during rich operation by using a map or a polynomial equation that reflects emissions from the catalyst based on the exhaust gas temperature and the exhaust gas flow rate of the exhaust passage and the excess-air factor upstream of the NOx trap catalyst, and an estimating unit that estimates an amount of adsorption in the NOx trap catalyst from the computed emission.

Therefore, according to the apparatus of the present invention, the emission amount from the NOx trap catalyst during rich operation is directly computed from the excess-air factor upstream of the NOx trap catalyst without obtaining values related to a reductant from cylinders. As a result, errors in the emission amount can be reduced and the NOx adsorption amount can be estimated using the emission amount with higher accuracy as compared with the case where values related to a reductant from cylinders are used.

Moreover, since the emission amount is calculated using the excess-air factor upstream of the NOx trap catalyst, the present invention can be applied to out-of-cylinder rich spike as well as in-cylinder rich spike.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

A preferred embodiment of the present invention will now be described in detail with reference to the drawings.

Figure 1:
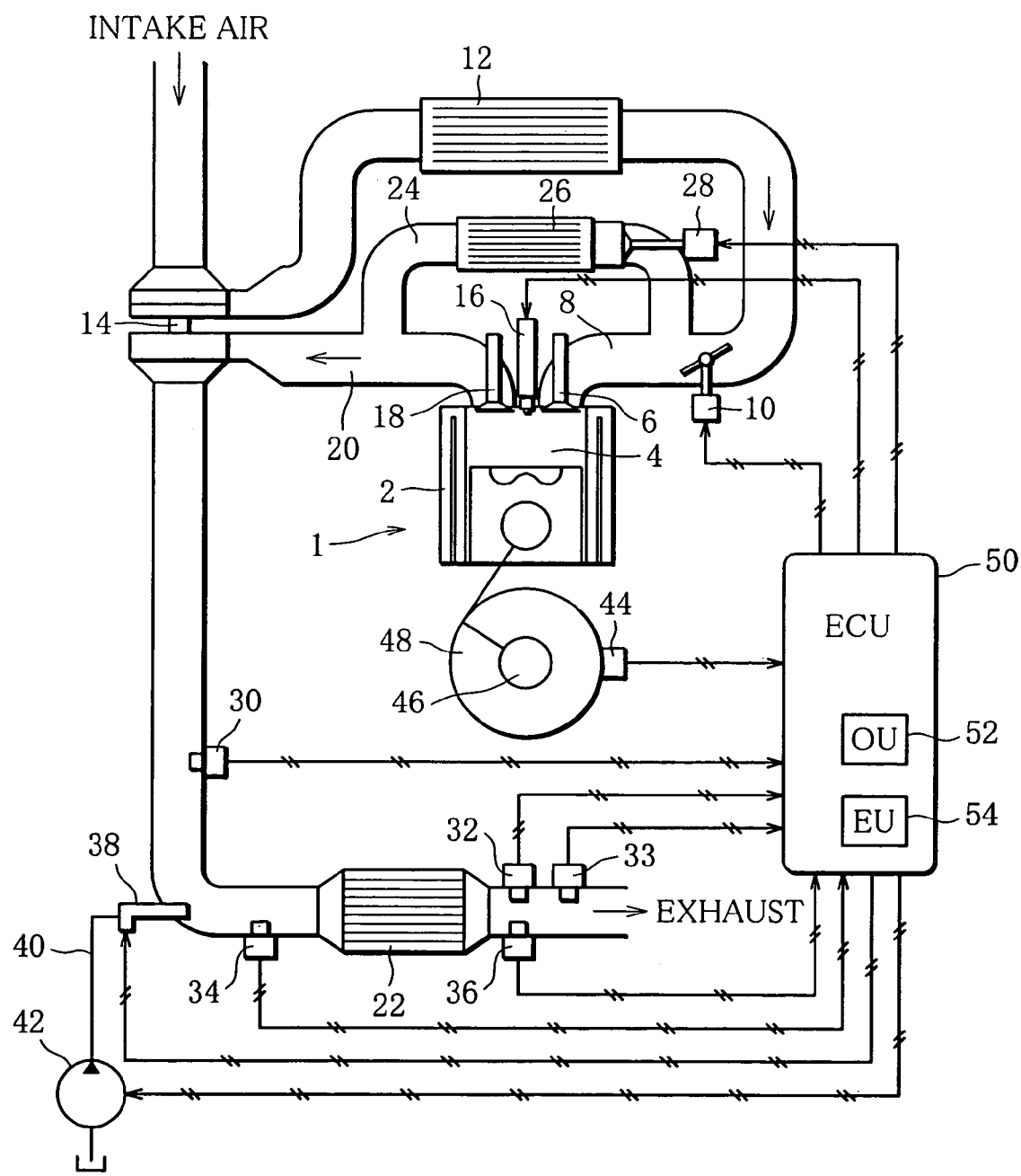
FIG. 1 is a diagram showing the construction of an engine system to which a NOx adsorption amount estimating apparatus according to an embodiment of the present invention is applied.

FIG. 1 illustrates the construction of an engine system. This system includes a diesel engine (hereinafter merely referred to as "the engine") 1 to which a NOx adsorption amount estimating apparatus according to an embodiment of the present invention is applied. As shown in FIG. 1, a fuel supply line 16, an intake passage 8, and an exhaust passage 20 are connected to each cylinder 2 of the engine 1. The line 16 has a fuel supply device. The passage 8 guides flesh air into a combustion chamber 4 in response to opening of an intake valve 6, and the passage 20 guides exhaust air from the combustion chamber 4 in response to opening of an exhaust valve 18.

A supercharger 14 is disposed in the upstream area of the intake passage 8, and an air cleaner, not shown, is connected to an end of the passage 8. Also, an inter-cooler 12 and an air-charging throttle 10, which adjusts the flow passage area of the passage 8, are disposed in the passage 8.

On the other hand, a NOx trap catalyst 22 is disposed in the downstream area of the exhaust passage 20. The catalyst 22 adsorbs NOx in exhaust gases when the exhaust air-fuel ratio is lean relative to the stoichiometric ratio, and releases and reduces the adsorbed NOx if unburned fuel (HC) or carbon monoxide (CO) as a reductant exists in the exhaust gases when the exhaust air-fuel ratio is rich. It should be noted that the catalyst 22 has a known structure.

An EGR passage 24 branches off from the exhaust passage 20, and an end of the passage 24 is connected to the intake passage 8. The passage 24 is provided with an EGR cooler 26 and an EGR valve 28. The valve 28 is electrically connected to an electronic control unit (ECU) 50.

Flesh air from the air cleaner enters the intake passage 8 via the supercharger 14 to reach the cooler 12. The air is adjusted by the throttle 10 and then guided into the combustion chamber 4 of each cylinder 2. Then, combustion of fuel supplied from the fuel supply line 16 causes a crank shaft 46 and a flywheel 48 to operate. When the combustion is finished, exhaust gases are emitted into the exhaust passage 20 and transported to the NOx trap catalyst 22.

Here, in the exhaust passage 20, an exhaust gas flow rate sensor 30 and an exhaust gas temperature sensor 34 are disposed at respective appropriate locations upstream of the NOx trap catalyst 22. The sensor 30 detects the exhaust gas flow rate $Q_E$ in the passage 20, and the sensor 34 detects the exhaust gas temperature $T_E$ in the passage 20. Also, a λ sensor 32, a catalytic temperature sensor 36, and a NOx sensor 33 are disposed at respective appropriate locations downstream of the catalyst 22. The sensor 32 detects the excess-air factor λ downstream of the catalyst 22, the sensor 36 detects the catalytic temperature $T_C$ of the catalyst 22, and the sensor 33 detects the concentration of NOx at the outlet of the catalyst 22. The sensors 30, 32, 33, 34, and 36 are electrically connected to the ECU 50.

On the other hand, in the present embodiment, an addition injector 38 that supplies unburned fuel (HC) directly into the catalyst 22 is disposed at an appropriate position upstream of the NOx trap catalyst 22, and the injector 38 is connected to a pump 42 via a fuel addition line 40.

Various sensors such as a crank angle sensor 44, which detect the operating state of the engine 1 as well as the above-mentioned sensors 30, 32, 33, 34, and 36 are electrically connected to the input of the ECU 50. Various actuators such as the above-mentioned fuel supply line 16, throttle 10, and injector 38 as well as the pump 42 are electrically connected to the output of the ECU 50.

The ECU 50 is provided with various maps; for example, various maps related to the estimation of NOx adsorption amount such as a NOx emission map for computing the NOx emission (reference emission $P_B$) of the catalyst 22 during the out-of-cylinder rich spike, as well as a map for obtaining the excess-air factor λu upstream of the catalyst 22, and a threshold map for obtaining a threshold value based on which it is determined whether rich operation is effective or not. Also, the ECU 50 is provided with a means for obtaining the excess-air factor λu upstream of the catalyst 22 from the intake air volume $Q_I$, the injected fuel quantity $q_i$ in the cylinder 2, the amount of addition $q_a$ by the injector 38, and so forth, as well as a means for obtaining the excess-air factor λu upstream of the catalyst 22 from the above maps.

The catalyst 22 adsorbs NOx in the exhaust gases in oxidized atmosphere, while the ECU 50 causes rich operation to be intermittently performed. In the present embodiment, rich operation is implemented by out-of-cylinder rich operation. That is, by the use of the injector 38 provided in the passage 20, the HC that is pressure-fed from the pump 42 is directly supplied into the exhaust gases in accordance with a rich spike instruction to produce conditions for rich operation, and if the conditions are satisfied, the adsorbed NOx is released and reduced.

Specifically, the ECU 50 is comprised of a NOx emission amount operation unit (OU) 52 and a NOx adsorption amount estimating unit (EU) 54. The operation unit 52 determines whether out-of-cylinder rich operation is effective or not, computes the reference emission amount PB during the out-of-cylinder rich operation, computes the final NOx emission (final emission amount $P_L$) by correction, and outputs the computation results to the estimating unit 54. More specifically, to determine whether the out-of-cylinder rich operation is effective or not, the engine speed Ne, the load L, and the catalytic temperature $T_C$ are input, and a threshold value for the determination is read out from the threshold map of the ECU 50. Then, the downstream excess-air factor λd detected by the λ sensor 32 is compared with the threshold value to determine whether the out-of-cylinder rich operation is effective or not.

On the other hand, the exhaust gas flow rate $Q_E$, the exhaust gas temperature $T_E$, and the upstream excess-air factor λu read out with reference to the map of the ECU 50 or the upstream excess-air factor λu computed by the ECU 50 are input, and the reference emission amount $P_B$ is computed using the NOx emission map. Then, the final emission amount $P_L$ is computed by correcting the reference emission amount $P_B$ in accordance with the time for which the out-of-cylinder rich operation is effective.

Then, the estimating unit 54 estimates the present NOx adsorption amount by subtracting the final emission amount $P_L$ of NOx released and reduced by the out-of-cylinder rich operation from the amount of NOx adsorption immediately before the present out-of-cylinder rich operation. It should be noted that the estimating unit 54 computes the amount of adsorption before emission by multiplying a difference between the output value from the NOx sensor 33 and the concentration of NOx at the inlet of the catalyst 22 by the exhaust gas flow rate $Q_E$, and the obtained integrated value is stored in the estimating unit 54.

Figure 2:
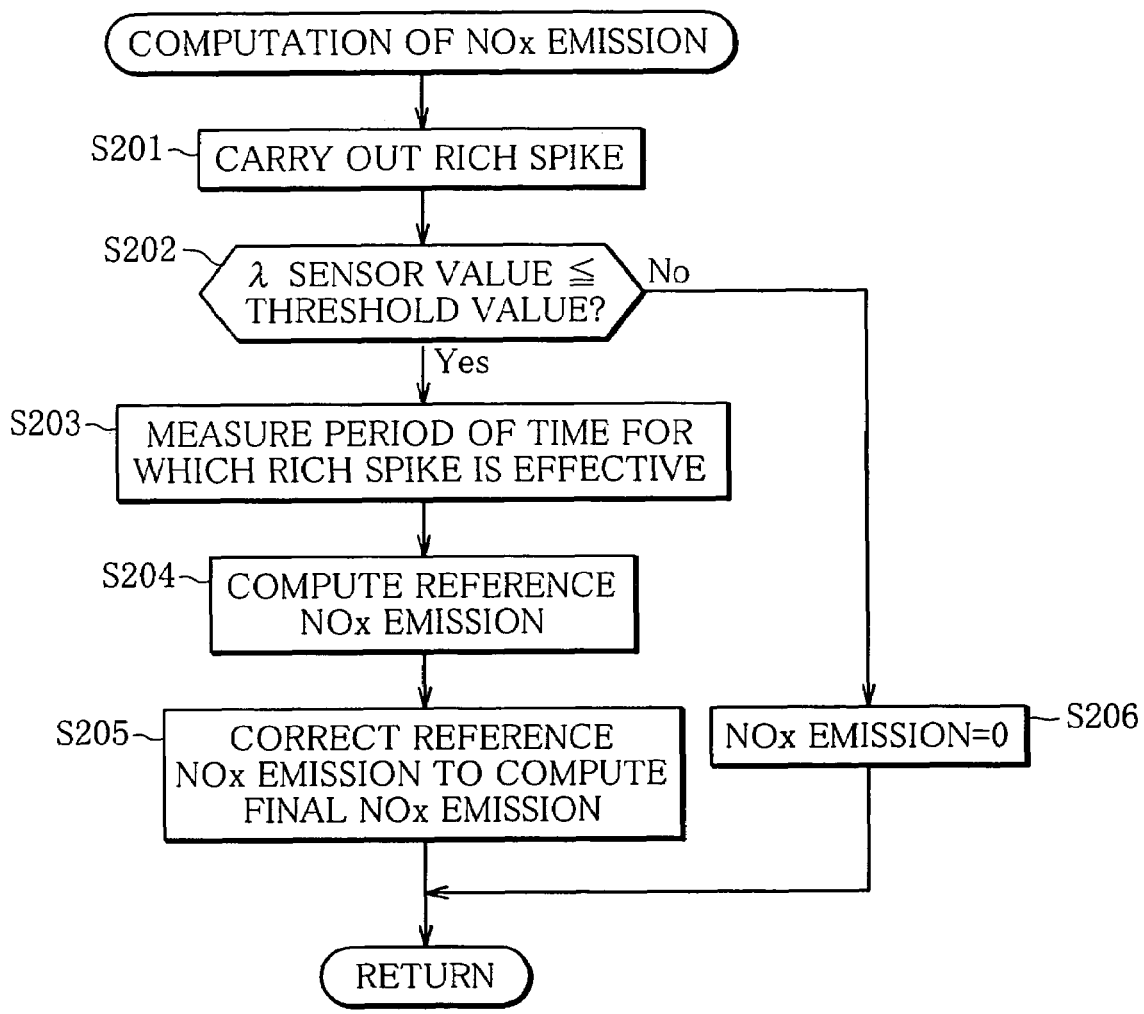
FIG. 2 is a flow chart showing a process in which the apparatus in FIG. 1 computes the NOx emission amount.

FIG. 2 is a flow chart showing a process in which the operation unit 52 computes the NOx emission amount. A description will now be given of the operation of the NOx adsorption amount estimating apparatus according to the present invention constructed as described above.

A step S201 in FIG. 2 is a step of carrying out out-of-cylinder rich operation, in which unburned fuel (HC) is added from the injector 38 to exhaust gases in accordance with a rich spike instruction from the ECU 50.

The next step S202 is a step of determining whether the out-of-cylinder rich operation is effective or not, in which the operation unit 52 determines whether or not the present out-of-cylinder rich operation is effective or not. Then, in the case where the downstream excess-air factor λd detected by the λ sensor 32 is not more than a threshold value as the reference for determining whether rich operation is effective or not, that is, if the determination result is positive (YES), the process proceeds to a step S203 wherein the time for which the out-of-cylinder rich operation is effective is measured. Then, the process proceeds to a step S204.

Figure 3:
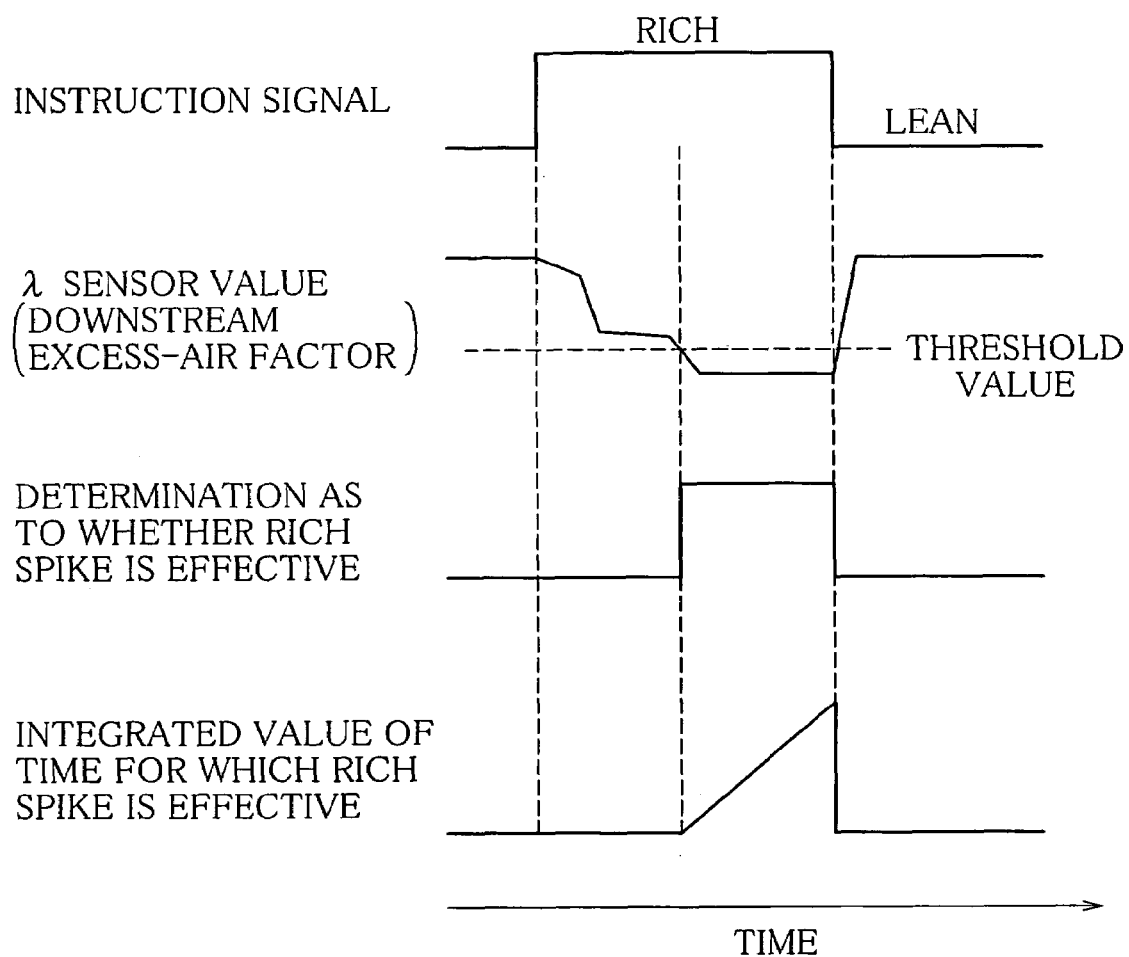
FIG. 3 is a timing chart showing a process in which the apparatus in FIG. 1 determines whether rich operation is effective or not.

This will now be described in further detail. FIG. 3 is a timing chart useful in explaining the determination as to whether rich operation is effective or not, i.e. a process in which the operation unit 52 determines whether rich operation is effective or not and measures the period of time for which the rich operation is effective. As shown in FIG. 3, when an instruction signal from the ECU 50 is switched from a lean state to a rich state, the detected value from the λ sensor 32, i.e. the downstream excess-air factor λd starts decreasing. Then, when the excess air factor λd becomes smaller than the threshold value, it is determined that the out-of-cylinder rich operation is effective, and measurement of the time for which the out-of-cylinder rich operation is effective is started. The time for which the out-of-cylinder rich operation is effective is accumulated until it is determined that the out-of-cylinder rich operation is not effective when the excess-air factor λd exceeds the threshold value.

The step S204 is a step of computing the NOx emission amount, in which the operation unit 52 computes the reference emission amount $P_B$ of the catalyst 22 during the out-of-cylinder rich operation, and the process proceeds to a step S205.

Figure 4:
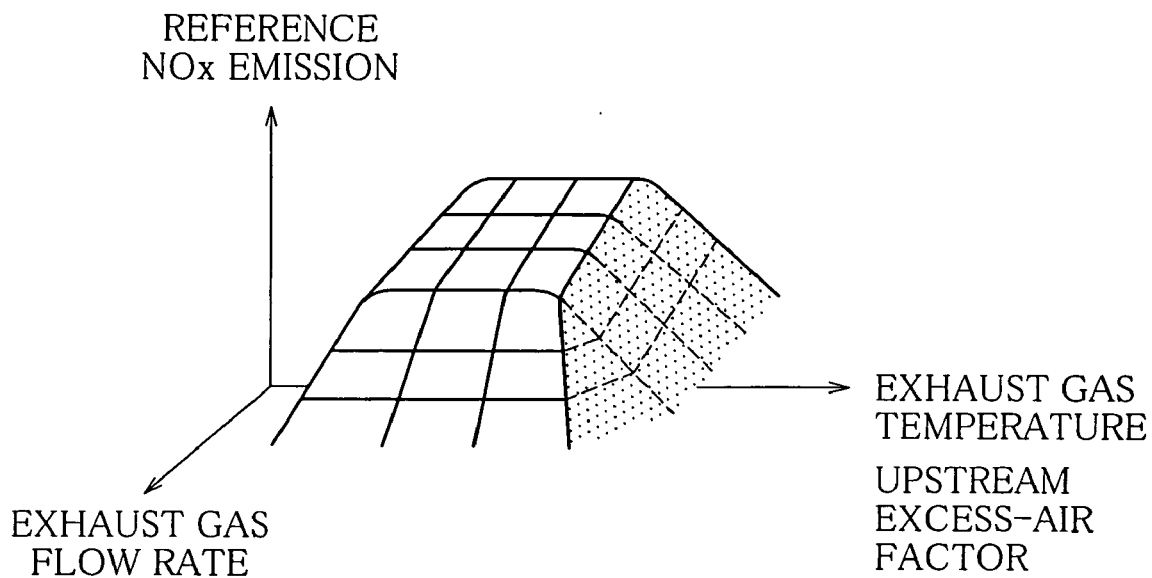
FIG. 4 is a diagram showing a NOx emission map of the apparatus in FIG. 1.

FIG. 4 illustrates the NOx emission map. The characteristics of the reference emission amount $P_B$ are obtained by experiments or the like, and as indicated by curves in FIG. 4, the reference emission amount $P_B$ is directly read out from the exhaust gas flow rate $Q_E$, the exhaust gas temperature $T_E$, and the calculated upstream excess-air factor λu. It should be noted that the computed reference emission amount $P_B$ means the NOx emission amount relative to the reference time that is set in advance.

The step S205 is a step of correcting the NOx emission amount, in which the operation unit 52 computes the final emission amount $P_L$ by correcting the reference emission amount $P_B$.

Figure 5:
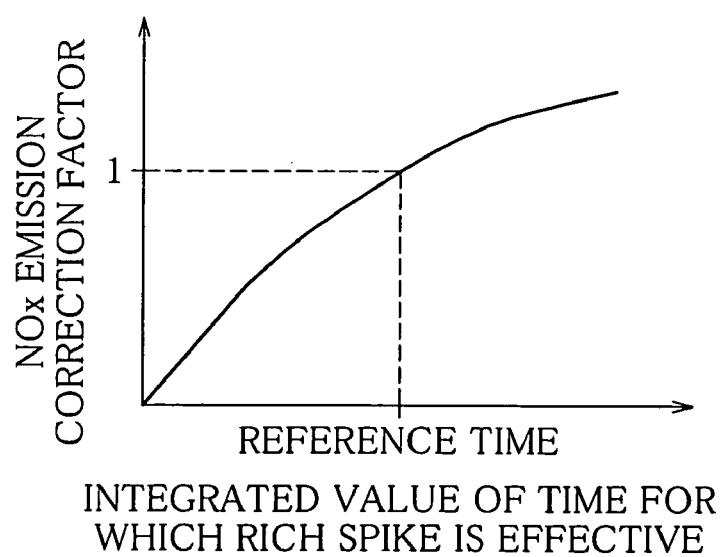
FIG. 5 is a diagram useful in explaining corrections made to the NOx emission amount by the apparatus in FIG. 1.

Specifically, as shown in FIG. 5, the correction factor for the NOx emission amount relative to the reference time is set to 1, and the correction factor increases as the integrated value of the time for which out-of-cylinder rich operation is effective increases. The reference emission amount $P_B$ computed in the step S204 is corrected in accordance with the integrated value of the time for which the out-of-cylinder rich operation is effective, which was measured in the step S203, to compute the final emission amount $P_L$ during the out-of-cylinder rich operation. Then, the process proceeds to a step of estimating the NOx adsorption amount.

On the other hand, in the step S202, if the downstream excess-air factor λd is greater than the threshold for the reason that, for example, rich spike does not achieve a successful outcome, the process proceeds to a step S206 wherein the NOx emission amount is set to 0 and the routine is brought to an end.

As described above, the present invention has been developed by focusing on directly obtaining the NOx emission amount from model's input parameters instead of focusing on obtaining the NOx emission amount after obtaining values related to a reductant from cylinders such as the utilization rate of the reductant and the estimated reductant concentration at the inlet of the catalyst 22.

Specifically, according to the present embodiment, since the reference emission amount $P_B$ during out-of-cylinder rich operation is directly computed from the exhaust gas temperature $T_E$, the exhaust gas flow rate $Q_E$, and the upstream excess-air factor λu, errors can be reduced and the NOx adsorption amount can be estimated with higher accuracy as compared with the case where the utilization rate of reductant and the estimated reductant concentration are used.

Moreover, since the reference emission amount $P_B$ is calculated using the upstream excess-air factor λu instead of values related to a reductant from cylinders, the NOx adsorption amount estimating apparatus can be applied not only to the above-described out-of-cylinder rich operation but also to in-cylinder rich operation, and also can be applied to the case where in-cylinder rich operation and out-of-cylinder rich operation are performed in combination. As a result, the scope of application of rich spike can be considerably widened.

Further, the upstream excess-air factor λu as the calculated value is used to compute the reference emission amount $P_B$, whereas the downstream excess-air factor λd as the detected value is used only to determine whether out-of-cylinder rich operation is effective or not. In other words, even in the case where the λ sensor 32 is disposed downstream of the catalyst 22 as in the present embodiment, the computation of the reference emission amount $P_B$ is not influenced at all by the response of the λ sensor 32. As a result, the NOx adsorption amount can be estimated with higher accuracy.

Further, it is not determined that out-of-cylinder rich operation is effective unless the downstream excess-air factor λd is smaller than the threshold value, even if a rich spike instruction signal is given. That is, only when rich spike really achieves a successful outcome, the adsorbed NOx is released and reduced, and the NOx adsorption amount is reduced, but in other cases, the NOx is not released and the NOx adsorption amount is not reduced. For this reason, the NOx adsorption amount can be estimated with higher accuracy, and satisfactory purification of exhaust gases can be accelerated.

Further, since the threshold value for use in determining whether out-of-cylinder rich operation is effective or not is determined depending on the engine speed Ne, the load L, and the catalyst temperature $T_C$, it is determined whether out-of-cylinder rich operation is effective or not can be determined in the optimum way depending on driving conditions and catalyst conditions. This contributes to acceleration of satisfactory exhaust gas purification.

By the way, the operation unit 52 according to the above described embodiment reads out the reference emission amount $P_B$ from the NOx emission map, but the present invention is not limited to this. For example, the characteristics of the NOx emission amount may be expressed by a polynomial equation. Specifically, the reference emission amount $P_B$ may be obtained from the following linear polynomial equation (1):

$$P_B = f(l, y, z) \qquad (1)$$
$$= j_0 + j_1 l + j_2 y + j_3 z + j_4 l y + j_5 y z + j_6 z l + j_7 l^2 y + j_8 l y^2 + \dots$$

where l denotes the upstream excess-air factor λu, y denotes the exhaust gas temperature $T_E$, z denotes the exhaust gas flow rate $Q_E$, and $j_i$ (i=0, 1, 2 . . . ) denotes a factor. It should be noted that for the factor $j_i$, an appropriate default value is set from characteristics obtained in advance by experiments or the like. In this case, the scope of application of rich spike can be widened and the NOx adsorption amount can be estimated with high accuracy as is the case with the above described embodiment.

Further, in place of the λ sensor 32, a linear $O_2$ sensor or a NOx sensor that detects the NOx concentration may be disposed downstream of the catalyst 22. In the case where the linear $O_2$ sensor is used, the downstream excess-air factor λd can be obtained by reading out the excess-air factor from a map, and in the case where the NOx sensor is used, the downstream excess-air factor λd can be obtained by an excess-air factor detecting function of the NOx sensor. Further, the locations of the sensors 30, 34, and 36 may be arbitrarily set to the specifications of the engine 1. Where detected values have not been obtained from these sensors, the exhaust gas flow rage $Q_E$ and the exhaust gas temperature $T_E$ in the exhaust passage 20 and the catalytic temperature $T_C$ may be obtained by calculations based on the engine speed, the injected fuel quantity in cylinders, and so forth, and the calculated value may be used for computation by the ECU 50.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of estimating an amount of NOx adsorption contained in a NOx trap catalyst disposed in an exhaust passage of an engine for adsorbing NOx in exhaust gases during a lean operation mode and releasing and reducing the adsorbed NOx during a rich operation mode in which unburned fuel is delivered to the NOx trap catalyst, comprising:
   a time measuring step of measuring a period in which a rich spike is occurring during the rich operation mode;
   an operation step of computing an amount of reference emission from the NOx trap catalyst during the measured period; and
   an estimating step of estimating an amount of adsorption in the NOx trap catalyst based on the computed reference emission amount,
   a determining step of determining whether the rich spike is occurring based on the excess-air factor downstream of the NOx trap catalyst,
   wherein in said operation step, the reference emission amount from the catalyst is computed using a map or a polynomial equation that reflects emissions from the NOx trap catalyst based on an exhaust gas temperature and an exhaust gas flow rate of the exhaust passage and an excess-air factor upstream of the NOx trap catalyst, and
   wherein the operating step corrects the reference emission amount based on the map or the polynomial equation according to the measured time.

2. A method of estimating an amount of adsorption in the NOx trap catalyst according to claim 1, wherein said determining step comprises comparing the excess-air factor downstream of the NOx trap catalyst with a threshold value for determining whether the rich spike is occurring, the threshold value being determined with a map based on revolutionary speed of the engine, load, and temperature of the NOx trap catalyst.

3. A method of estimating an amount of adsorption in the NOx trap catalyst disposed in an exhaust passage of an engine for adsorbing NOx in exhaust gases during lean operation and releasing and reducing the adsorbed NOx during rich operation, comprising:
   an operation step of computing an amount of emission from the catalyst during rich operation; and
   an estimating step of estimating an amount of adsorption in the NOx trap catalyst from the computed emission amount,
   wherein in said operation step, the emission amount from the catalyst is computed with a polynomial equation that reflects emissions from the NOx trap catalyst based on an exhaust gas temperature and an exhaust gas flow rate of the exhaust passage and an excess-air factor upstream of the NOx trap catalyst,
   wherein the polynomial equation for computing the emission amount $P_B$ of the NOx trap catalyst is represented by:

$$P_B = f(l, y, z)$$
$$= j_0 + j_1 l + j_2 y + j_3 z + j_4 l y + j_5 y z + j_6 z l + j_7 l^2 y + j_8 l y^2 + \dots$$

where l denotes the excess-air factor upstream of the catalyst, y denotes the exhaust gas temperature $T_E$, z is the exhaust gas flow rate $Q_E$, and ji(i=0, 1, 2 . . . ) denotes a factor.

4. An apparatus for estimating an amount of NOx adsorption in a NOx trap catalyst disposed in an exhaust passage of an engine for adsorbing NOx contained in exhaust gases during lean operation and releasing and reducing the adsorbed NOx during rich operation, comprising:
   an operation unit that computes an amount of emission from the NOx trap catalyst during rich operation with a polynomial equation that reflects emissions from the catalyst based on an exhaust gas temperature and an exhaust gas flow rate of the exhaust passage and an excess-air factor upstream of the NOx trap catalyst; and
   an estimating unit that estimates an amount of adsorption in the NOx trap catalyst from the computed emission amount,
   wherein the polynomial equation for computing the emission amount $P_B$ of the NOx trap catalyst is represented by:

$$P_B = f(l, y, z)$$
$$= j_0 + j_1 l + j_2 y + j_3 z + j_4 l y + j_5 y z + j_6 z l + j_7 l^2 y + j_8 l y^2 + \dots ,$$

where l denotes the excess-air factor upstream of the catalyst, y denotes the exhaust gas temperature $T_E$, z is the exhaust gas flow rate $Q_E$, and ji(i=0, 1, 2 . . . ) denotes a factor.

* * * * *